United States Patent
Bo et al.

(10) Patent No.: US 11,875,007 B2
(45) Date of Patent: Jan. 16, 2024

(54) TOUCH SUBSTRATE AND DISPLAY DEVICE

(71) Applicant: BOE Technology Group Co., Ltd., Beijing (CN)

(72) Inventors: Zewen Bo, Beijing (CN); Dalin Xiang, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 263 days.

(21) Appl. No.: 17/263,289

(22) PCT Filed: Jul. 23, 2020

(86) PCT No.: PCT/CN2020/103830
§ 371 (c)(1),
(2) Date: Jan. 26, 2021

(87) PCT Pub. No.: WO2021/093366
PCT Pub. Date: May 20, 2021

(65) Prior Publication Data
US 2022/0300118 A1   Sep. 22, 2022

(30) Foreign Application Priority Data
Nov. 15, 2019   (CN) .......................... 201911121726.X

(51) Int. Cl.
*G06F 3/044*   (2006.01)
*G06F 3/041*   (2006.01)

(52) U.S. Cl.
CPC .......... *G06F 3/0448* (2019.05); *G06F 3/0412* (2013.01); *G06F 3/04164* (2019.05); *G06F 2203/04111* (2013.01)

(58) Field of Classification Search
CPC .. G06F 3/0448; G06F 3/0412; G06F 3/04164; G06F 2203/04111; G06F 3/0443; G06F 3/0446; G06F 2203/04107
See application file for complete search history.

(56) References Cited

U.S. PATENT DOCUMENTS

2010/0182258 A1   7/2010   Jung et al.
2013/0088448 A1*  4/2013   Seo .................. G06F 3/0446
                                              345/173

(Continued)

FOREIGN PATENT DOCUMENTS

CN   103105991 A   5/2013
CN   103353818 A   10/2013

(Continued)

OTHER PUBLICATIONS

Chinese Office Action for corresponding 201911121726.X dated Mar. 16, 2021.

*Primary Examiner* — Amit Chatly
(74) *Attorney, Agent, or Firm* — ArentFox Schiff LLP; Michael Fainberg

(57) ABSTRACT

The present disclosure discloses a touch substrate and a display device. The touch substrate includes a base substrate and further includes a touch driving electrode, a touch sensing electrode and a grounding electrode which are located on the base substrate and insulated from one another. An orthographic projection of the grounding electrode on the base substrate and orthographic projections of the touch driving electrode and the touch sensing electrode on the base substrate have a non-overlapping region with each other.

18 Claims, 5 Drawing Sheets

(56) References Cited

U.S. PATENT DOCUMENTS

| | | |
|---|---|---|
| 2015/0091866 A1 | 4/2015 | Deng et al. |
| 2015/0220173 A1 | 8/2015 | Lu et al. |
| 2015/0247943 A1 | 9/2015 | Shimada et al. |
| 2016/0048248 A1 | 2/2016 | Na et al. |
| 2018/0113532 A1 | 4/2018 | Shinoda |
| 2019/0302921 A1 | 10/2019 | Chen et al. |
| 2020/0089369 A1* | 3/2020 | Bang .................... G06F 3/0416 |
| 2020/0218384 A1 | 7/2020 | Guo et al. |

FOREIGN PATENT DOCUMENTS

| | | |
|---|---|---|
| CN | 104820308 A | 8/2015 |
| CN | 104881189 A | 9/2015 |
| CN | 105373251 A | 3/2016 |
| CN | 106201146 A | 12/2016 |
| CN | 106648265 A | 5/2017 |
| CN | 107977121 A | 5/2018 |
| CN | 109491550 A | 3/2019 |
| CN | 110308829 A | 10/2019 |
| CN | 110865737 A | 3/2020 |
| KR | 20130035763 A | 4/2013 |

\* cited by examiner

TOUCH SUBSTRATE AND DISPLAY DEVICE

CROSS-REFERENCE TO RELATED APPLICATIONS

The present disclosure claims is a National Stage of International Application No. PCT/CN2020/103830, filed Jul. 23, 2020, which claims the priority to Chinese patent application No. 201911121726.X filed to the China Patent Office on Nov. 15, 2019, and entitled "TOUCH SUBSTRATE AND DISPLAY DEVICE", both of which are incorporated herein by reference.

FIELD

The present disclosure relates to the technical field of touch display, in particular to a touch substrate and a display device.

BACKGROUND

With development of a display technology, people have increasingly higher requirements on a display panel, and display panels gradually develop to ultrathin, flexible and bendable display panels, wherein integrated thinning of a module stacking structure is beneficial to meeting requirements of bending, curling and the like.

However, along with thinning of the thickness of the module stacking structure, touch point detection abnormality is prone to occurring in a mutual capacitance type touch structure under the circumstance of low ground mass (LGM). Specifically, capacitance formed by a finger and the earth is very small under the circumstance of the LGM, and the current passing ability of this passage is very weak, thereby resulting in decrease of the mutual capacitance variable quantity detected by a touch chip. Even because of access of capacitance formed by the finger and a touch driving electrode and of capacitance formed by the finger and a touch sensing electrode, the total equivalent capacitance is increased, and the touch chip cannot detect normally.

Therefore, the technical problem of how to increase the accuracy rate of the touch point detection under the circumstance of the LGM urgently needs to be solved by those of ordinary skill in the art.

SUMMARY

In one aspect, an embodiment of the present disclosure provides a touch substrate including a base substrate and further including a touch driving electrode, a touch sensing electrode and a grounding electrode, wherein the touch driving electrode, the touch sensing electrode and the grounding electrode are located on the base substrate and insulated from one another; wherein an orthographic projection of the grounding electrode on the base substrate and orthographic projections of the touch driving electrode and the touch sensing electrode on the base substrate have a non-overlapping region with each other.

In a possible implementation, in the touch substrate provided by the embodiment of the present disclosure, the touch driving electrode includes a plurality of driving electrode blocks arranged in array, and the touch sensing electrode includes a plurality of sensing electrode blocks arranged in array; and the touch driving electrode further comprises a plurality of first bridging sub electrodes configured to electrically connect the adjacent driving electrode blocks and arranged on a layer different from a layer on which the plurality of driving electrode blocks is arranged, or the touch sensing electrode further comprises a plurality of second bridging sub electrodes configured to electrically connect the adjacent sensing electrode blocks and arranged on a layer different from a layer on which the plurality of sensing electrode blocks.

In a possible implementation, the touch substrate provided by the embodiment of the present disclosure further includes a grounding wire located on the base substrate, and the grounding wire is electrically connected with the grounding electrode.

In a possible implementation, in the touch substrate provided by the embodiment of the present disclosure, the grounding electrode is arranged on the same layer with the driving electrode blocks and the sensing electrode blocks.

In a possible implementation, the touch substrate provided by the embodiment of the present disclosure further includes a floating electrode, and the floating electrode is arranged on the same layer with the driving electrode blocks and the sensing electrode blocks in an insulated mode; the floating electrode is located between the driving electrode blocks and the grounding electrode; and/or the floating electrode is located between the sensing electrode blocks and the grounding electrode.

In a possible implementation, in the touch substrate provided by the embodiment of the present disclosure, the floating electrode surrounds the grounding electrode.

In a possible implementation, in the touch substrate provided by the embodiment of the present disclosure, a shape of the floating electrode is the same as a shape of a border of the grounding electrode.

In a possible implementation, in the touch substrate provided by the embodiment of the present disclosure, the floating electrode is a strip electrode, and a long edge of the floating electrode is parallel to an adjacent side edge of the grounding electrode.

In a possible implementation, in the touch substrate provided by the embodiment of the present disclosure, the grounding wire is arranged on the same layer with the bridging sub electrodes.

In a possible implementation, in the touch substrate provided by the embodiment of the present disclosure, the grounding electrode is located on one side of the base substrate away from the driving electrode blocks and the sensing electrode blocks.

In a possible implementation, in the touch substrate provided by the embodiment of the present disclosure, the orthographic projection of the grounding electrode on the base substrate does not overlap with the orthographic projections of the touch driving electrode and the touch sensing electrode on the base substrate.

In a possible implementation, in the touch substrate provided by the embodiment of the present disclosure, the grounding wire is arranged on the same layer with the grounding electrode.

In a possible implementation, in the touch substrate provided by the embodiment of the present disclosure, a hollowed-out region exists in the driving electrode blocks and/or the sensing electrode blocks; and an orthographic projection of the hollowed-out region on the base substrate and the orthographic projection of the grounding electrode on the base substrate have an overlapping region with each other.

In a possible implementation, in the touch substrate provided by the embodiment of the present disclosure, the hollowed-out region is located in a center region of the driving electrode blocks and/or the sensing electrode blocks.

In a possible implementation, in the touch substrate provided by the embodiment of the present disclosure, the grounding electrode is located in the hollowed-out region.

In a possible implementation, in the touch substrate provided by the embodiment of the present disclosure, an orthographic projection of a gap region between the driving electrode blocks and the sensing electrode blocks on the base substrate and the orthographic projection of the grounding electrode on the base substrate have an overlapping region with each other.

In a possible implementation, in the touch substrate provided by the embodiment of the present disclosure, the grounding electrode is located in the gap region.

In a possible implementation, in the touch substrate provided by the embodiment of the present disclosure, the grounding electrode is a long-strip-shaped electrode, and a long edge of the grounding electrode is parallel to adjacent edges of the driving electrode blocks and the sensing electrode blocks.

In a possible implementation, in the touch substrate provided by the embodiment of the present disclosure, an occupied area of the grounding electrode is 20%-40% of that of the driving electrode blocks and the sensing electrode blocks.

In another aspect, an embodiment of the present disclosure further provides a display device including the touch substrate provided by any above-mentioned embodiment and a display panel; and the touch substrate is attached to one side of a light emitting surface of the display panel, or, the touch substrate is embedded in the display panel.

DETAILED DESCRIPTION OF THE EMBODIMENTS

Figure 1:
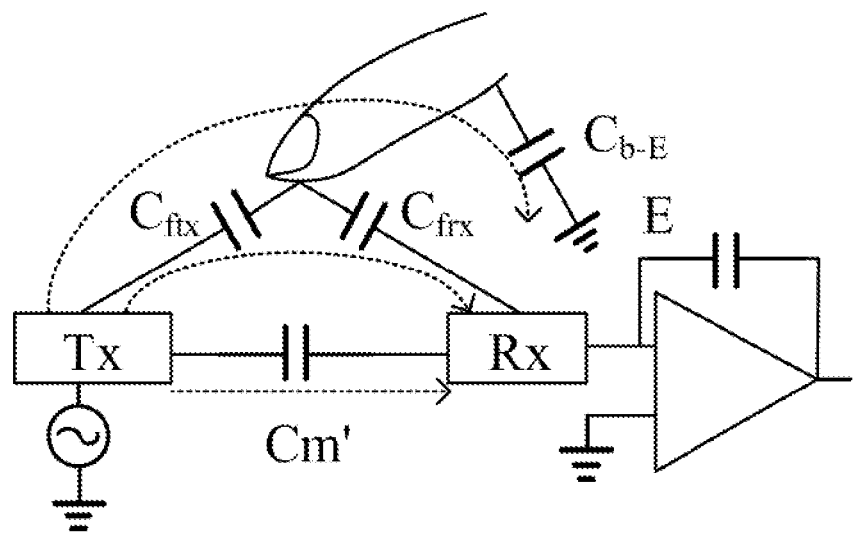
FIG. 1 is a schematic diagram of a circuit structure of a touch substrate during touch in the related art.

In the related art, a schematic diagram of a circuit structure of an ultrathin stacking structure under the circumstance of low ground mass is shown as FIG. 1. Under the circumstance of the low ground mass, capacitance $C_{b-E}$ formed between a finger and the earth E is very small, and the current passing ability of this passage is weak, thereby resulting in the small variable quantity of total equivalent capacitance detected on a sensing electrode block RX; and even because of access of capacitance $C_{ftx}$ formed between the finger and a driving electrode block TX and capacitance $C_{frx}$ formed between the finger and the sensing electrode block RX, the total equivalent capacitance is increased. However, a touch chip connected with the sensing electrode block RX can normally detect a touch position only when the decrease quantity of the total equivalent capacitance is larger than a preset threshold value, and the touch chip cannot normally detect the touch position when the decrease quantity of the total equivalent capacitance is small or the total equivalent capacitance is increased. This touch detection abnormality is particularly prominent during touch of a thumb or a thicker copper pillar, this is because an overlap area between the thumb or the thicker copper pillar and the driving electrode block TX as well as the sensing electrode block RX is large, thereby increasing $C_{ftx}$ and $C_{frx}$, thus the total equivalent capacitance is increased, and the touch position cannot be detected.

Based on the problem existing in the related art, the embodiments of the present disclosure provide a touch substrate and a display device. To make the object, the technical solution and advantages of the present disclosure clearer, the specific implementations of the touch substrate and the display device provided by the embodiments of the present disclosure are described in detail with reference to the accompanying drawings. It should be understood that the described preferred embodiments are merely configured to illustrate and explain the present disclosure rather than limiting the present disclosure. The embodiments in the present disclosure and features in the embodiments may be mutually combined without conflict.

Unless otherwise defined, technical or scientific terms used in the present disclosure shall have the ordinary meanings understood by those ordinarily skilled in the art to which the present disclosure pertains. Words "first", "second" and the like used in the present disclosure do not indicate any order, quantity or importance, but are only configured to distinguish different components. Words "comprise" or "include" and the like indicate that an element or item appearing before such the word covers listed elements or items appearing after the word and equivalents thereof, and does not exclude other elements or items. Words "connect" or "couple" and the like are not limited to physical or mechanical connection, but may include electrical connection, whether direct or indirect. "Upper", "lower", "left", "right" and the like are only configured to represent the relative position relationship, and the relative position relationship may also change accordingly after an absolute position of a described object is changed.

The shapes and sizes of all components in the accompanying drawings do not reflect the true scale, and are merely intended to schematically illustrate the content of the present disclosure.

Figure 2:
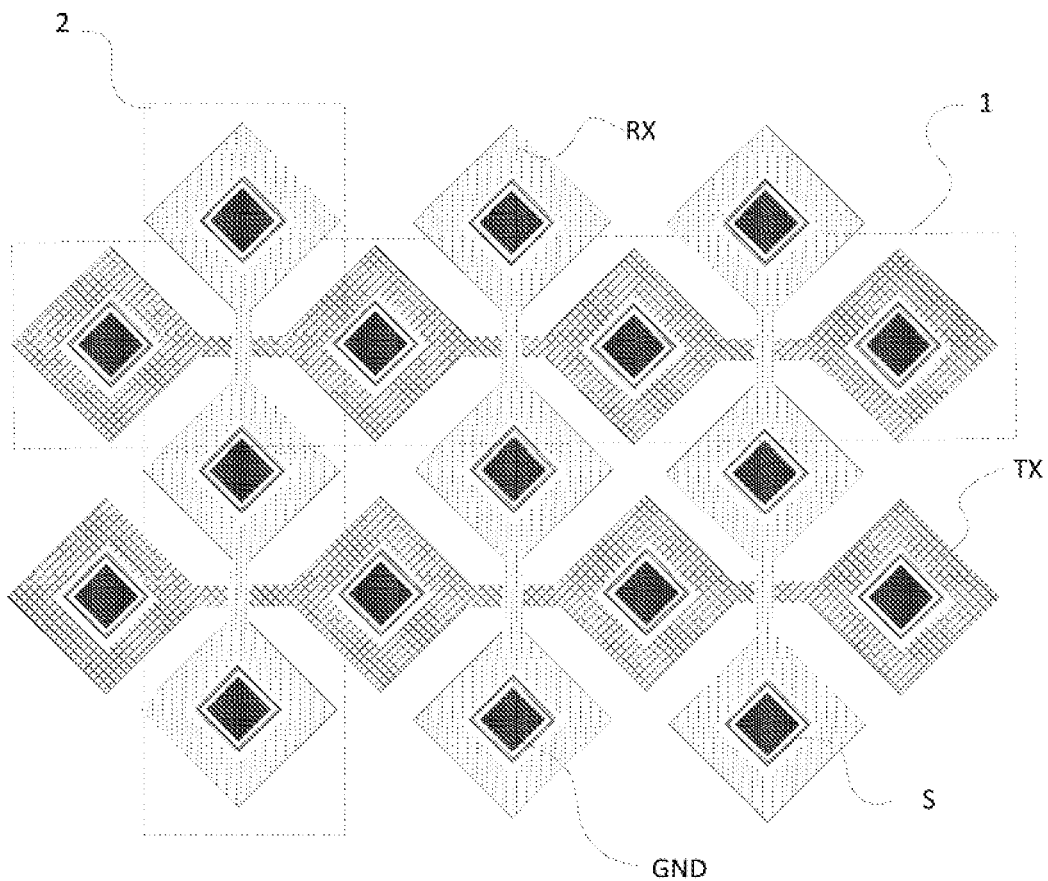
FIG. 2 is a schematic structural diagram of a touch substrate provided by an embodiment of the present disclosure.
Figure 3:
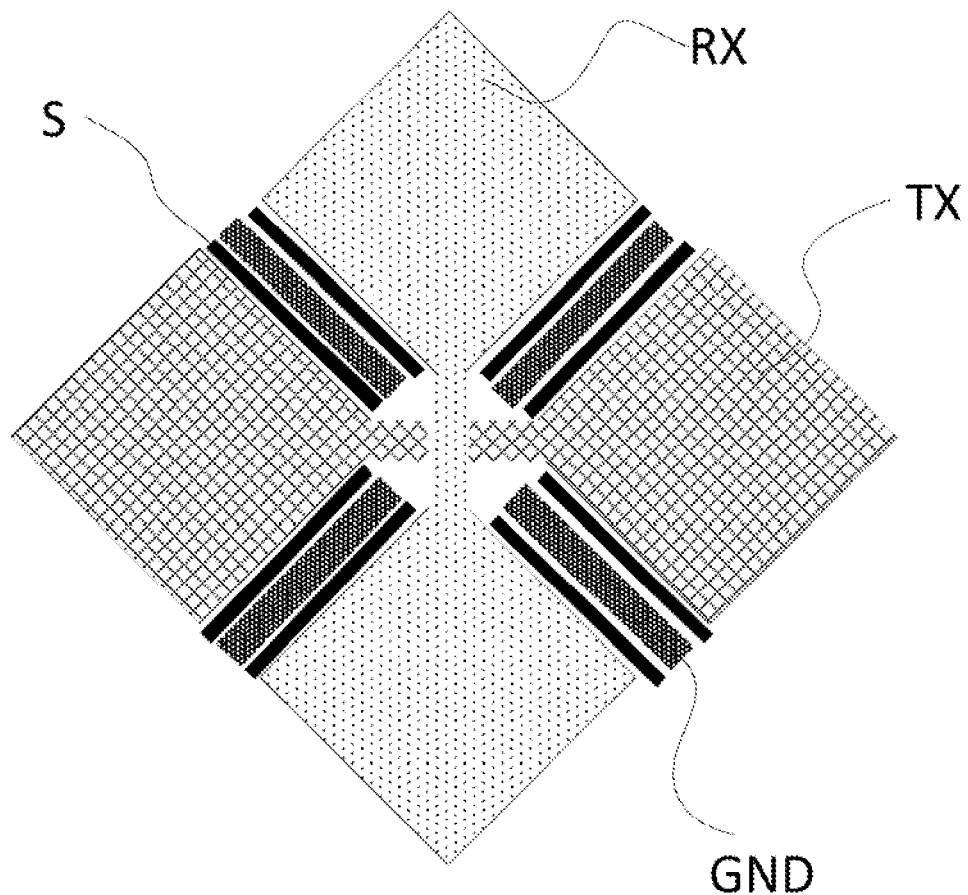
FIG. 3 is a schematic structural diagram of a touch substrate provided by an embodiment of the present disclosure.

Specifically, the embodiment of the present disclosure provides a touch substrate. As shown in FIG. 2 and FIG. 3, the touch substrate includes a base substrate (not specifically shown in the figures), and further includes a touch driving electrode 1, a touch sensing electrode 2 and a grounding electrode GND which are located on the base substrate and insulated from one another.

An orthographic projection of the grounding electrode GND on the base substrate and orthographic projections of the touch driving electrode 1 and the touch sensing electrode 2 on the base substrate have a non-overlapping region with each other.

It should be noted that in the touch substrate provided by the embodiment of the present disclosure, firstly, the grounding electrode needs to be insulated from the touch driving electrode and the touch sensing electrode, and this is because capacitance is formed by the three electrodes and a finger during touch; secondly, the grounding electrode need to have the non-overlapping region with the touch driving electrode as well as the touch sensing electrode, that is, the grounding electrode cannot be completely covered by the touch driving electrode and the touch sensing electrode and can be partially covered, this is because when the grounding electrode is completely covered by the touch driving electrode and the touch sensing electrode, a grounding signal on the grounding electrode can be shielded, consequently, the capacitance cannot be formed between the finger and the grounding electrode during touch of the finger, and the problem of touch position detection abnormality during low ground mass cannot be relieved.

Specifically, a relative position relationship between the grounding electrode and the touch driving electrode as well as the touch sensing electrode may be shown as FIG. 2 and may also be shown as FIG. 3. Certainly, the grounding electrode may also be other regions meeting the conditions, which is not specifically limited herein.

Figure 4:
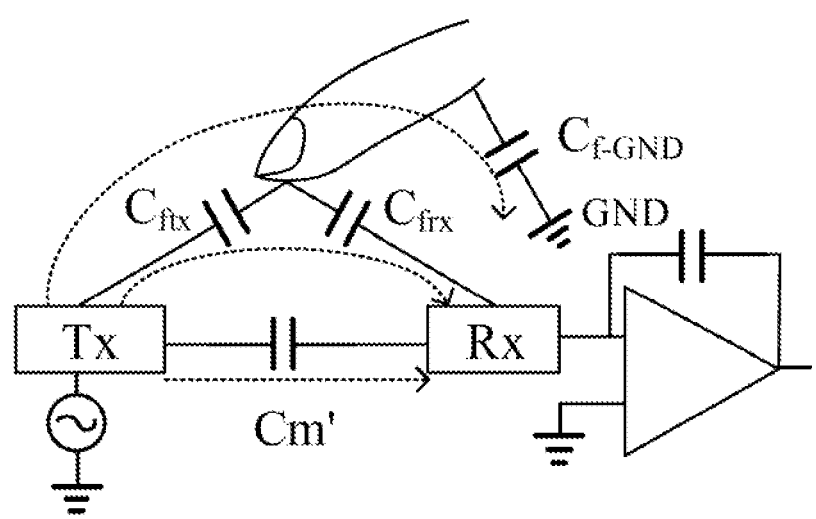
FIG. 4 is a schematic diagram of a circuit structure of a touch substrate during touch provided by an embodiment of the present disclosure.

Specifically, in the touch substrate provided by the embodiment of the present disclosure, after the grounding electrode is arranged, a schematic diagram of a circuit structure during touch is shown as FIG. 4. The capacitance $C_{f\text{-}GND}$ is formed between the finger and the grounding electrode GND during touch, the current passing ability of this passage is improved, and when $C_{f\text{-}GND}$ is in parallel connection with $C_f$ and $C_{fx}$, the decrease quantity of the total equivalent capacitance is increased. The decrease quantity is a difference value between the total equivalent capacitance detected on a sensing electrode block RX during touch and the capacitance formed by a driving electrode block TX and the sensing electrode block RX when there is no touch. When a touch chip obtains the decrease quantity, a touch position can be accurately detected.

Specifically, in the touch substrate provided by the embodiment of the present disclosure, the capacitance formed between the finger and the earth is increased by arranging the grounding electrode on the touch substrate, therefore, the capacitance formed between the finger and the earth is in parallel connection with capacitance formed between the finger and the touch driving electrode as well as capacitance formed between the finger and the touch sensing electrode, the total equivalent capacitance is decreased during touch, the variable quantity of the total equivalent capacitance is increased, the touch chip detects a touch point advantageously, and detection accuracy of the touch point is improved.

Figure 5A:
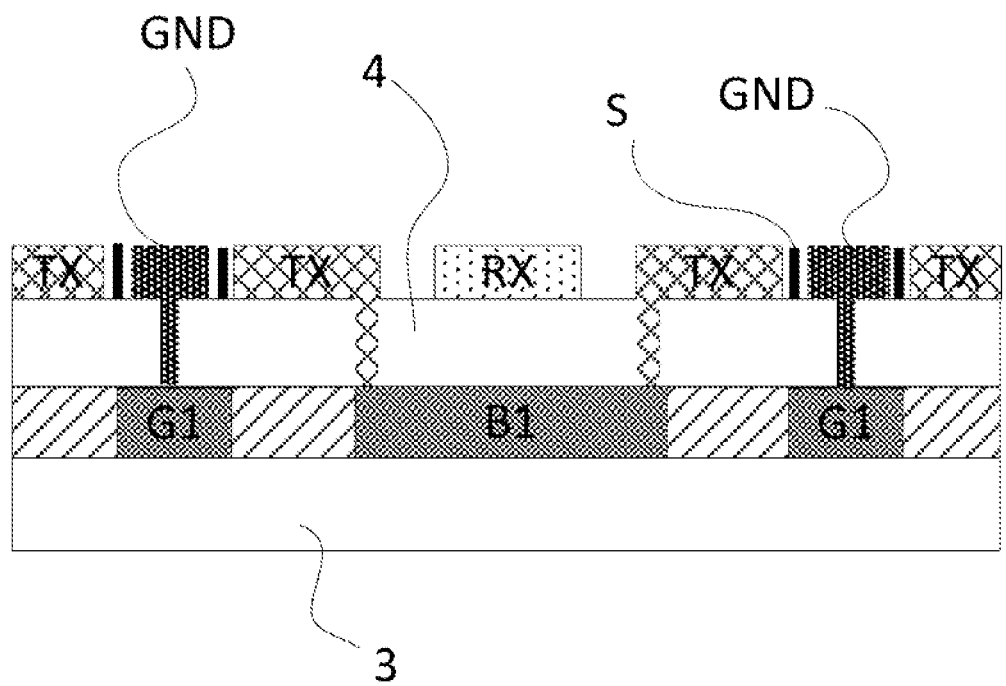
FIG. 5A is a schematic diagram of a cross-sectional structure of a touch substrate provided by an embodiment of the present disclosure.
Figure 5B:
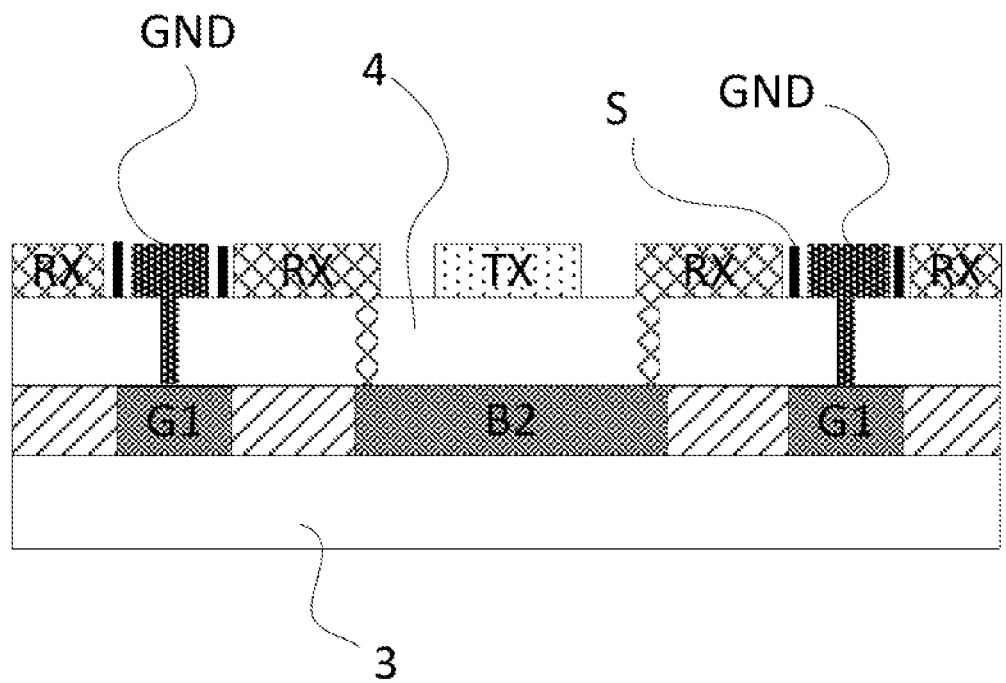
FIG. 5B is a schematic diagram of another cross-sectional structure of the touch substrate provided by the embodiment of the present disclosure.

Optionally, in the touch substrate provided by the embodiment of the present disclosure, as shown in FIGS. 2, 5A and 5B, the touch driving electrode 1 includes the plurality of driving electrode blocks TX arranged in array, and the touch sensing electrode 2 includes the plurality of sensing electrode blocks RX arranged in array.

The touch driving electrode 1 further includes a plurality of first bridging sub electrodes B1 arranged on a different layer from the plurality of driving electrode blocks TX and configured to electrically connect the adjacent driving electrode blocks TX, or the touch sensing electrode 2 further includes a plurality of second bridging sub electrodes B2 arranged on a different layer from the plurality of sensing electrode blocks RX and configured to electrically connect the adjacent sensing electrode blocks RX.

Specifically, in the touch substrate provided by the embodiment of the present disclosure, a schematic diagram of a cross-sectional structure of the touch substrate in FIG. 5A is indicated by taking the example that the touch driving electrode 1 includes the first bridging sub electrodes B1 arranged on the different layer from the driving electrode blocks TX, and under the circumstance, connecting electrodes between all the sensing electrode blocks RX are arranged on the same layer with all the sensing electrode blocks RX. An insulating layer 4 is arranged between the driving electrode blocks TX and the first bridging sub electrodes B1, and the driving electrode blocks TX are electrically connected with the first bridging sub electrodes B1 through via holes formed in the insulating layer 4.

Specifically, in the touch substrate provided by the embodiment of the present disclosure, a schematic diagram of another cross-sectional structure of the touch substrate in FIG. 5B is indicated by taking the example that the touch sensing electrode 2 includes the second bridging sub electrodes B2 arranged on the different layer from the sensing electrode blocks RX, and under the circumstance, connecting electrodes between all the driving electrode blocks TX are arranged on the same layer with all the driving electrode blocks TX. An insulating layer 4 is arranged between the sensing electrode blocks RX and the second bridging sub electrodes B2, and the sensing electrode blocks RX are electrically connected with the second bridging sub electrodes B2 through via holes formed in the insulating layer 4.

Both the two abovementioned circumstances fall within the protection scope of the present disclosure, and can be selected according to actual using conditions, which is not specifically limited herein.

Optionally, the touch substrate provided by the embodiment of the present disclosure, as shown in FIGS. 5A and 5B, further includes a grounding wire G1 located on the base substrate 3, and the grounding wire G1 is electrically connected with the grounding electrode GND.

Specifically, the touch substrate provided by the embodiment of the present disclosure further includes the grounding wire electrically connected with the grounding electrode, one end of the grounding wire is connected with the grounding electrode, the other end of the grounding wire is connected with a grounding structure of a device where the grounding wire is located, that is, a voltage on the grounding wire is an earth voltage. FIG. 5A shows the situation that the grounding wire G1 is arranged on the same layer with the bridging sub electrodes B1 when the grounding electrode GND is arranged on the same layer with the driving electrode blocks TX and the sensing electrode blocks RX. When the grounding electrode GND is not arranged on the same layer with the driving electrode blocks TX and the sensing electrode blocks RX, the grounding wire G1 may be arranged on the same layer with the grounding electrode GND, certainly, the grounding wire G1 may also be arranged on another film layer and electrically connected with the grounding electrode GND through a formed via hole. Different selection can be made according to different designs, which is not specifically limited herein.

Optionally, in the touch substrate provided by the embodiment of the present disclosure, as shown in FIGS. 5A and 5B, the grounding electrode GND is arranged on the same layer with the driving electrode blocks TX and the sensing electrode blocks RX.

Specifically, in the touch substrate provided by the embodiment of the present disclosure, as shown in FIGS. 5A and 5B, the grounding electrode GND is arranged on the same layer with the driving electrode blocks TX and the sensing electrode blocks RX. Through the arrangement, the number of the film layer is decreased, the thickness of the touch substrate can be effectively reduced, and thus the touch substrate may be embedded in a display panel and may be applied to a flexible display device.

It should be noted that in the touch substrate provided by the embodiment of the present disclosure, the grounding electrode is arranged on the same layer with the driving electrode blocks and the sensing electrode blocks. According to arrangement on the same layer, the grounding electrode may be located on the same plane with the driving electrode blocks and the sensing electrode blocks, or the grounding electrode, a touch electrode and a sensing electrode are made of the same material and composed by adopting the same preparation technology. Selection can be made according to actual design conditions of the touch substrate, which is not specifically limited herein.

Optionally, the touch substrate provided by the embodiment of the present disclosure, as shown in FIGS. 2, 3, 5A and 5B, further includes a floating electrode S, and the floating electrode S is arranged on the same layer with the driving electrode blocks TX and the sensing electrode blocks RX in an insulated mode.

The floating electrode S is located between the driving electrode blocks TX and the grounding electrode GND; and/or, the floating electrode S is located between the sensing electrode blocks RX and the grounding electrode GND.

Specifically, in the touch substrate provided by the embodiment of the present disclosure, the floating electrode is arranged mainly to weaken generated influence of the earth voltage on the grounding electrode on signals applied onto the driving electrode blocks and the sensing electrode blocks so as to improve the accuracy of the touch detection.

In the touch substrate provided by the embodiment of the present disclosure, the grounding electrode GND and the floating electrode S have various selections in position and shape. The position of the grounding electrode GND may be shown as FIG. 2, that is, a hollowed-out region is formed in the driving electrode blocks TX and/or the sensing electrode blocks RX, and the grounding electrode GND is arranged in the hollowed-out region. The position of the grounding electrode GND may also be shown as FIG. 3, that is, the grounding electrode GND is arranged in a gap region between the driving electrode blocks TX and the adjacent sensing electrode blocks RX. When the grounding electrode GND is arranged in the hollowed-out region, the grounding electrode GND may be a block electrode, such as rectangle, rhombus, circle or ellipse. When the grounding electrode GND is arranged in the gap region between the driving electrode blocks TX and the adjacent sensing electrode blocks RX, the grounding electrode GND may be arranged to be a strip electrode due to the limited width of the gap region. However, the grounding electrode GND may also be in other shapes, the specific shape is flexibly selected according to actual design, which is not specifically limited herein.

Optionally, in the touch substrate provided by the embodiment of the present disclosure, as shown in FIG. 2, the floating electrode S surrounds the grounding electrode GND.

Specifically, in the touch substrate provided by the embodiment of the present disclosure, as shown in FIG. 2, when the grounding electrode GND is located in the hollowed-out region, the driving electrode blocks TX or the sensing electrode blocks RX are arranged around the grounding electrode GND, thus the floating electrodes S need to be arranged around the grounding electrode GND so as to prevent a grounding voltage on the grounding electrode GND from influencing touch signals applied onto the driving electrode blocks TX or the sensing electrode blocks RX, and therefore, the floating electrodes S may surround the grounding electrode GND so as to play a signal shielding role on the periphery of the grounding electrode GND.

Optionally, in the touch substrate provided by the embodiment of the present disclosure, as shown in FIG. 2, a shape of the floating electrode S is the same as a shape of a border of the grounding electrode GND.

For example, when the grounding electrode is rectangular, the floating electrodes adjacent to the grounding electrode define a rectangular region, and when the grounding electrode is circular, the floating electrodes adjacent to the grounding electrode define a circular region so as to reasonably utilize the space in the hollowed-out region.

Optionally, in the touch substrate provided by the embodiment of the present disclosure, as shown in FIG. 3, the floating electrode S is a strip electrode, and a long edge of the floating electrode S is parallel to an adjacent side edge of the grounding electrode GND.

Specifically, in the touch substrate provided by the embodiment of the present disclosure, as shown in FIG. 3, when the grounding electrode GND is located in the gap region between the driving electrode blocks TX and the sensing electrode blocks RX, the grounding electrode GND is arranged as a strip electrode. Meanwhile, in order to save the space occupied by the floating electrode S, the floating electrode S may also be arranged as a strip electrode and arranged between the grounding electrode GND and the driving electrode blocks TX, and/or arranged between the grounding electrode GND and the sensing electrode blocks RX, the long edge of the floating electrode S is parallel to a side edge connected with the grounding electrode GND, in this way, the extending length of the floating electrode S may be increased as far as possible, and short circuit of the grounding electrode GND and the floating electrode S is avoided.

Optionally, in the touch substrate provided by the embodiment of the present disclosure, as shown in FIGS. 5A and 5B, the grounding wire G1 is arranged on the same layer with the bridging sub electrodes B1/B2.

Specifically, in the touch substrate provided by the embodiment of the present disclosure, when the grounding electrode is arranged on the same layer with the driving electrode blocks and the sensing electrode blocks, the grounding wire may be arranged on the same layer with the bridging sub electrodes. By forming a via hole in an insulating layer located between the driving electrode block and a bridging electrode, the grounding electrode is electrically connected with the grounding wire. Through a structure, arrangement of a film layer can be reduced, the grounding wire and the bridging sub electrodes can be formed by adopting the same technology, and a manufacturing technology is simplified. Certainly, the grounding wire may be also located on an individual film layer, and selection is made according to actual needs, which is not specifically limited herein.

Figure 6:
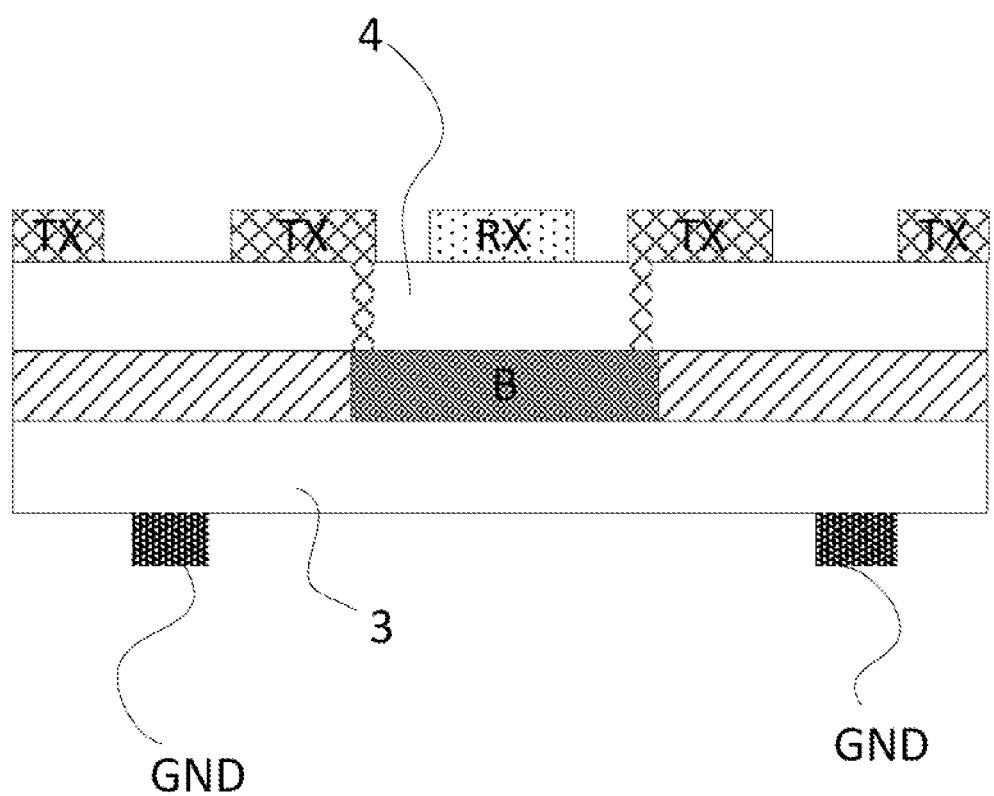
FIG. 6 is a schematic diagram of yet another cross-sectional structure of the touch substrate provided by the embodiment of the present disclosure.

Optionally, in the touch substrate provided by the embodiment of the present disclosure, as shown in FIG. 6, which is a schematic diagram of another cross-sectional structure of FIG. 2, the grounding electrode GND is located on the side of the base substrate 3 away from the driving electrode blocks TX and the sensing electrode blocks RX.

Specifically, in the touch substrate provided by the embodiment of the present disclosure, when the touch substrate is combined with a display panel in an external attaching mode, the grounding electrode on the touch substrate may also be arranged on the side of the base substrate facing away from the driving electrode blocks and the sensing electrode blocks. In this way, influence of the grounding electrode on signals applied onto the driving electrode blocks and the sensing electrode blocks may be reduced, and meanwhile, requirements on etching precision of the grounding electrode are also reduced. When the base substrate is thick (50 um-60 um), the grounding electrode may be arranged in a whole layer mode, and an etching technology is omitted.

Optionally, in the touch substrate provided by the embodiment of the present disclosure, the orthographic projection of the grounding electrode on the base substrate does not overlap with the orthographic projections of the touch driving electrode and the touch sensing electrode on the base substrate.

Specifically, in the touch substrate provided by the embodiment of the present disclosure, even if when the base substrate is thick and the grounding electrode is arranged in a whole layer mode, an overlap area exist between the grounding electrode and the driving electrode blocks as well as the sensing electrode blocks, thus capacitance is also formed between the grounding electrode and the driving electrode blocks as well as the sensing electrode blocks, and consequently, an earth voltage on the grounding electrode may influence signals applied to the driving electrode blocks and the sensing electrode blocks. Therefore, the grounding electrode is arranged on the gap region of the film layer where the driving electrode blocks and the sensing electrode blocks are located, thus the overlap area existing between the grounding electrode and the driving electrode blocks as well as the sensing electrode blocks can be avoided, and the influence of the earth voltage on the grounding electrode on the signals applied onto the driving electrode blocks and the sensing electrode blocks is also reduced.

Optionally, in the touch substrate provided by the embodiment of the present disclosure, the grounding wire is arranged on the same layer with the grounding electrode.

Specifically, in the touch substrate provided by the embodiment of the present disclosure, the grounding electrode is arranged on the side of the base substrate facing away from the driving electrode blocks and the sensing electrode blocks, thus the film layer where the grounding electrode is located is sufficient in space, the grounding wire may be directly arranged on the same layer with the grounding electrode, another film layer does not need to be additionally arranged, no via hole needs to be etched for connection, and the preparation technology is simplified.

Optionally, in the touch substrate provided by the embodiment of the present disclosure, as shown in FIG. 2, the hollowed-out region exists between the driving electrode blocks TX and/or the sensing electrode blocks RX.

An orthographic projection of the hollowed-out region on the base substrate and an orthographic projection of the grounding electrode GND on the base substrate have an overlapping region with each other.

Specifically, in the touch substrate provided by the embodiment of the present disclosure, in order to make the orthographic projection of the grounding electrode on the base substrate have the non-overlapping region with the orthographic projections of the driving electrode blocks and the sensing electrode blocks on the base substrate, and make ground capacitance be conveniently formed between the finger and the grounding electrode, as shown in FIG. 2, the hollowed-out region is formed in all the driving electrode blocks TX and/or the sensing electrode blocks RX, the grounding electrode GND in the hollowed-out region is not covered by the driving electrode blocks TX and the sensing electrode blocks RX, and the grounding electrode and the finger may form the ground capacitance. Meanwhile, due to arrangement of the hollowed-out region, an area of the driving electrode blocks TX and an area of the sensing electrode blocks RX are also reduced accordingly, load capacitance formed by the driving electrode blocks TX as well as the sensing electrode blocks RX and a cathode layer in a display panel is also reduced accordingly, and accuracy of touch detection is improved advantageously.

Optionally, in the touch substrate provided by the embodiment of the present disclosure, as shown in FIG. 2, the hollowed-out region may be formed in the center region of the driving electrode blocks TX and/or the sensing electrode blocks RX, thus patterns of the hollowed-out region are designed advantageously, and uniformity of a cover area of the driving electrode blocks TX and/or the sensing electrode blocks RX located around the hollowed-out region in all the directions can be ensured. Certainly, the hollowed-out region may also be located in a non-center region of the driving electrode blocks TX and/or the sensing electrode blocks RX. Selection may be made according to actual design needs, which is not limited specifically herein.

Optionally, in the touch substrate provided by the embodiment of the present disclosure, as shown in FIG. 2, the grounding electrode GND is located in the hollowed-out region.

Specifically, in the touch substrate provided by the embodiment of the present disclosure, as shown in FIG. 2, the grounding electrode GND is arranged in the hollowed-out region. The grounding electrode GND may be arranged on the same layer with, or the different layer from, the driving electrode blocks TX and the sensing electrode blocks RX, which can both ensure that the overlap area does not exist between the grounding electrode GND and the driving electrode blocks TX as well as the sensing electrode blocks RX. Through the arrangement, it may be ensured that capacitance is not formed between the grounding electrode GND and the driving electrode blocks TX, nor is formed between the grounding electrode GND and the sensing electrode blocks RX, and thus it is ensured that touch signals loaded on the driving electrode blocks TX and the sensing electrode blocks RX are stable.

Optionally, in the touch substrate provided by the embodiment of the present disclosure, as shown in FIG. 3, the orthographic projection of the gap region between the driving electrode blocks TX and the sensing electrode blocks RX on the base substrate and the orthographic projection of the grounding electrode GND on the base substrate have the overlapping region with each other.

Specifically, in the touch substrate provided by the embodiment of the present disclosure, covering for the grounding electrode can be avoided by adopting the mode that the hollowed-out region is formed in the driving electrode blocks and the sensing electrode blocks, and by further adopting the mode that the grounding electrode is arranged at the gap region between the driving electrode blocks and the sensing electrode blocks.

Optionally, in the touch substrate provided by the embodiment of the present disclosure, as shown in FIG. 3, the grounding electrode GND may be arranged in the gap region between the driving electrode blocks TX and the sensing electrode blocks RX, so that the grounding electrode GND does not have the overlapping region with the adjacent driving electrode blocks TX as well as the sensing electrode blocks RX, and the stability of signals loaded on the driving electrode blocks TX and the sensing electrode blocks RX is ensured.

As shown in FIG. 3, when the grounding electrode GND is arranged in the gap region between the driving electrode blocks TX and the sensing electrode blocks RX, the grounding electrode GND may be arranged in a long strip shape, and a long edge of the grounding electrode GND may be parallel to adjacent edges of the driving electrode blocks TX and the sensing electrode blocks RX, so that a space in the gap region is reasonably utilized. The grounding electrode GND may be a long-strip-shaped electrode and may further be in other shapes, which can be selected according to actual design needs, and not specifically limited herein.

Certainly, the two abovementioned modes may also be combined, that is, the hollowed-out region is formed in the driving electrode blocks and/or the sensing electrode blocks, grounding electrode blocks are also arranged at the gap region between the driving electrode blocks and the sensing electrode blocks. Selection may be made according to needs, which are not specifically limited herein.

Optionally, in the touch substrate provided by the embodiment of the present disclosure, an occupied area of the grounding electrode is 20%-40% of that of the driving electrode blocks and the sensing electrode blocks.

Specifically, in the touch substrate provided by the embodiment of the present disclosure, the occupied area of the grounding electrode is set to be 20%-40% of that of the driving electrode blocks and the sensing electrode blocks, an area of a touch region can be ensured, and realization of the grounding electrode function can also be ensured. Meanwhile, the load capacitance formed by the driving electrode blocks as well as the sensing electrode blocks and a cathode in the display panel may also be reduced by properly reducing the area of the driving electrode blocks and the area of the sensing electrode blocks, and the accuracy of the touch detection is improved.

Based on the same inventive concept, an embodiment of the present disclosure further provides a display device, and the display device includes the touch substrate provided by any above-mentioned embodiment and a display panel. The touch substrate is attached to one side of a light emitting surface of the display panel, or, the touch substrate is embedded in the display panel.

Figure 7:
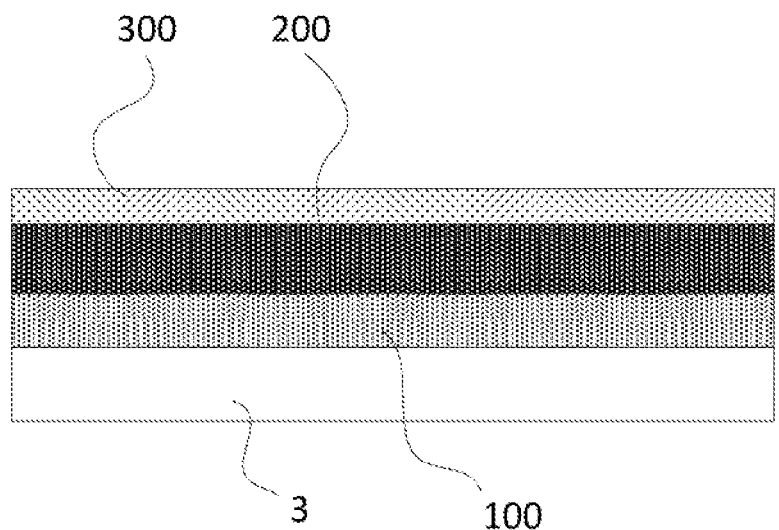
FIG. 7 is a schematic diagram of a cross-sectional structure of a display device provided by an embodiment of the present disclosure.

Specifically, in the display device provided by the embodiment of the present disclosure, when the touch substrate and the display panel are subjected to embedded design, the structure is as shown in FIG. 7 and includes the display panel 100, the touch substrate 200 and a packaging cover plate 300 which are sequentially located on a base substrate 3. Through the structure, a touch structure, such as a touch driving electrode, a touch sensing electrode and a grounding electrode, on the touch substrate 200 may be directly manufactured after all film layers of the display panel 100 are manufactured, and uniform packaging is conducted after the touch structure is manufactured. Through the arrangement, the film layers can be reduced, and thinning of the display device is facilitated.

Figure 8:
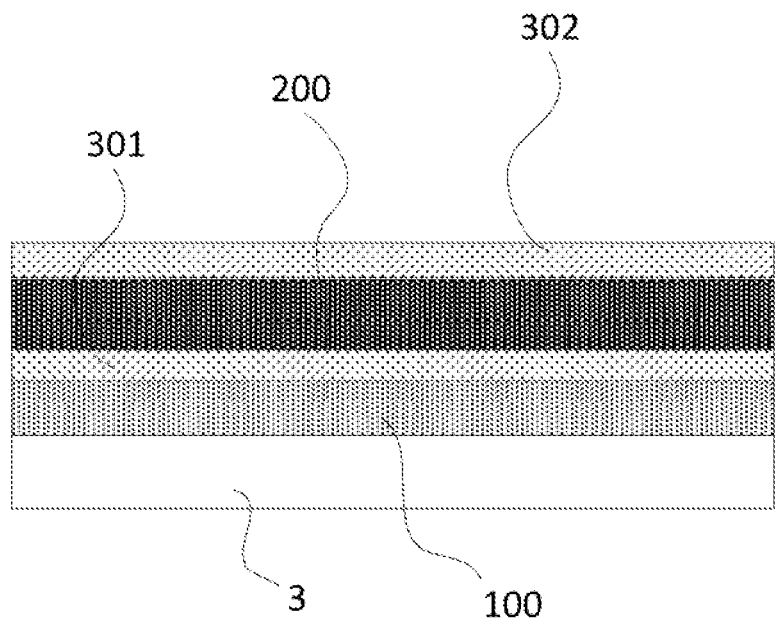
FIG. 8 is a schematic diagram of another cross-sectional structure of the display device provided by the embodiment of the present disclosure.

When the touch substrate and the display panel are subjected to external attaching design, the structure is as shown in FIG. 8 and includes the display panel 100, a first packaging structure 301, the touch substrate 200 and a second packaging structure 302 which are sequentially located on the base substrate 3. That is to say, the touch substrate is directly attached to the packaged display panel, the display panel and the touch substrate may be manufactured separately, and thus the manufacturing difficulty may be reduced.

The display device has all advantages of the touch substrate provided by the above-mentioned embodiment, the principle and specific implementations of the display device are the same as those of the touch substrate provided by the above-mentioned embodiment and can be implemented referring to the touch substrate provided by the above-mentioned embodiment, which is not repeated herein.

The embodiments of the present disclosure provide the touch substrate and the display device. The touch substrate includes the base substrate and further includes the touch driving electrode, the touch sensing electrode and the grounding electrode which are located on the base substrate and insulated from one another. The orthographic projection of the grounding electrode on the base substrate and the orthographic projections of the touch driving electrode and the touch sensing electrode on the base substrate have the non-overlapping region with each other. Capacitance formed between a finger and the earth is increased by arranging the grounding electrode on the touch substrate, therefore, the capacitance formed between the finger and the earth is in parallel connection with capacitance formed between the finger and the touch driving electrode as well as capacitance formed between the finger and the touch sensing electrode, total equivalent capacitance is decreased during touch, the variable quantity of the total equivalent capacitance is increased, the touch chip detects a touch point advantageously, and detection accuracy of the touch point is improved.

Apparently, a person skilled in the art can make various modifications and variations to the present disclosure without departing from the spirit and scope of the present disclosure. In this way, if these modifications and variations of the present disclosure fall within the scope of the claims of the present disclosure and equivalent technologies thereof, the present disclosure is also intended to include these modifications and variations.

What is claimed is:

1. A touch substrate, comprising:
a base substrate, a touch driving electrode, a touch sensing electrode and a grounding electrode and a floating electrode;
wherein the touch driving electrode, the touch sensing electrode and the grounding electrode are located on the base substrate and insulated from one another; wherein an orthographic projection of the grounding electrode on the base substrate and orthographic projections of the touch driving electrode and the touch sensing electrode on the base substrate have a non-overlapping region with each other;
the touch driving electrode comprises a plurality of driving electrode blocks arranged in array, and the touch sensing electrode comprises a plurality of sensing electrode blocks arranged in array; and the touch driving electrode further comprises a plurality of first bridging sub electrodes configured to electrically connect the adjacent driving electrode blocks and arranged in a layer different from a layer in which the plurality of driving electrode blocks is arranged, or the touch sensing electrode further comprises a plurality of second bridging sub electrodes configured to electrically connect the adjacent sensing electrode blocks and arranged in a layer different from a layer in which the plurality of sensing electrode blocks;

the floating electrode is located between the driving electrode blocks and the grounding electrode, and/or the floating electrode is located between the sensing electrode blocks and the grounding electrode; and an orthographic projection of the floating electrode on the base substrate surrounds an orthographic projection of the grounding electrode on the base substrate; and the orthographic projections of the touch driving electrode and the touch sensing electrode on the base substrate are not located between the orthographic projection of the floating electrode on the base substrate and the orthographic projection of the grounding electrode on the base substrate.

2. The touch substrate according to claim 1, further comprising: a grounding wire located on the base substrate, wherein the grounding wire is electrically connected with the grounding electrode.

3. The touch substrate according to claim 2, wherein the grounding electrode is arranged on the same layer with the driving electrode blocks and the sensing electrode blocks.

4. The touch substrate according to claim 3, wherein the floating electrode is arranged on the same layer with the driving electrode blocks and the sensing electrode blocks in an insulated mode.

5. The touch substrate according to claim 1, wherein a shape of the floating electrode is the same as a shape of a border of the grounding electrode.

6. The touch substrate according to claim 4, wherein the floating electrode is a strip electrode, and a long edge of the floating electrode is parallel to an adjacent side edge of the grounding electrode.

7. The touch substrate according to claim 3, wherein the grounding wire is arranged on the same layer with the bridging sub electrodes.

8. The touch substrate according to claim 2, wherein the grounding electrode is located on one side of the base substrate away from the driving electrode blocks and the sensing electrode blocks.

9. The touch substrate according to claim 8, wherein the orthographic projection of the grounding electrode on the base substrate does not overlap with the orthographic projections of the touch driving electrode and the touch sensing electrode on the base substrate.

10. The touch substrate according to claim 9, wherein the grounding wire is arranged on the same layer with the grounding electrode.

11. The touch substrate according to claim 1, wherein a hollowed-out region exists in the driving electrode blocks and/or the sensing electrode blocks; and an orthographic projection of the hollowed-out region on the base substrate and the orthographic projection of the grounding electrode on the base substrate have an overlapping region with each other.

12. The touch substrate according to claim 11, wherein the hollowed-out region is located in a center region of the driving electrode blocks and/or the sensing electrode blocks.

13. The touch substrate according to claim 12, wherein the grounding electrode is located in the hollowed-out region.

14. The touch substrate according to claim 1, wherein an orthographic projection of a gap region between the driving electrode blocks and the sensing electrode blocks on the base substrate and the orthographic projection of the grounding electrode on the base substrate have an overlapping region with each other.

15. The touch substrate according to claim 14, wherein the grounding electrode is located in the gap region.

16. The touch substrate according to claim 15, wherein the grounding electrode is a long-strip-shaped electrode, and a long edge of the grounding electrode is parallel to adjacent edges of the driving electrode blocks and the sensing electrode blocks.

17. The touch substrate according to claim 1, wherein an occupied area of the grounding electrode is 20%-40% of that of the driving electrode blocks and the sensing electrode blocks.

18. A display device, comprising the touch substrate according to claim 1 and a display panel; wherein the touch substrate is attached to one side of a light emitting surface of the display panel, or, the touch substrate is embedded in the display panel.

* * * * *